US010782561B2

(12) United States Patent
Kawase et al.

(10) Patent No.: US 10,782,561 B2
(45) Date of Patent: Sep. 22, 2020

(54) LIGHT-EMITTING DEVICE, DISPLAY APPARATUS, AND LIGHTING APPARATUS

(71) Applicant: SONY CORPORATION, Tokyo (JP)

(72) Inventors: Mitsuhiro Kawase, Kanagawa (JP); Yohei Takakuwa, Tokyo (JP); Roger Corn, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/737,538

(22) PCT Filed: Jun. 16, 2016

(86) PCT No.: PCT/JP2016/067927
§ 371 (c)(1),
(2) Date: Dec. 18, 2017

(87) PCT Pub. No.: WO2016/208484
PCT Pub. Date: Dec. 29, 2016

(65) Prior Publication Data
US 2018/0173059 A1    Jun. 21, 2018

(30) Foreign Application Priority Data

Jun. 26, 2015   (JP) ................ 2015-128409

(51) Int. Cl.
*G02F 1/1335*    (2006.01)
*G02F 1/13357*   (2006.01)

(52) U.S. Cl.
CPC .. *G02F 1/133605* (2013.01); *G02F 1/133603* (2013.01); *G02F 1/133606* (2013.01);
(Continued)

(58) Field of Classification Search
CPC .............................................. G02F 1/133605
See application file for complete search history.

(56) References Cited

U.S. PATENT DOCUMENTS

2002/0039292 A1   4/2002  Matsui
2009/0316402 A1  12/2009  Fan et al.
(Continued)

FOREIGN PATENT DOCUMENTS

CN    101641547 A    2/2010
EP      2138753 A1   12/2009
(Continued)

OTHER PUBLICATIONS

International Search Report and Written Opinion of PCT Application No. PCT/JP2016/067927, dated Sep. 13, 2016, 08 pages of ISRWO.

*Primary Examiner* — Sang V Nguyen
(74) *Attorney, Agent, or Firm* — Lerner, David, Littenberg, Krumholz & Mentlik, LLP

(57) ABSTRACT

Provided is a light-emitting device having an excellent light emission performance irrespective of its small thickness. The light-emitting device includes a base having a surface; one or more light sources that are provided on the surface of the base, and each have an optical axis; a reflective lens provided to interpose the light source between the reflective lens and the base; a reflective sheet that is provided to surround the light source along the surface of the base, and includes a first surface that makes a first angle relative to a plane that is substantially orthogonal to the optical axis to allow the first surface to be away also from the base as the first surface is away from the light source; and a light diffusion member provided to interpose the light source, the reflective lens, and the reflective sheet, between the light diffusion member and the base.

15 Claims, 17 Drawing Sheets

(52) U.S. Cl.
CPC .......... *G02F 1/133608* (2013.01); *G02F 2001/133607* (2013.01)

(56) References Cited

U.S. PATENT DOCUMENTS

| | | | | |
|---|---|---|---|---|
| 2010/0165466 A1* | 7/2010 | Endo | ............ | B32B 7/14 |
| | | | | 359/599 |
| 2010/0296270 A1* | 11/2010 | Gomi | ............ | G02F 1/133605 |
| | | | | 362/97.3 |
| 2011/0013119 A1* | 1/2011 | Ha | ............ | G02B 5/02 |
| | | | | 349/64 |
| 2011/0063850 A1* | 3/2011 | Oide | ............ | F21K 9/68 |
| | | | | 362/296.01 |
| 2011/0096265 A1* | 4/2011 | Murakoshi | ...... | G02F 1/133603 |
| | | | | 349/64 |
| 2011/0304796 A1* | 12/2011 | Lee | ............ | G02B 6/0021 |
| | | | | 349/62 |
| 2012/0069248 A1* | 3/2012 | Yokota | ............ | G02F 1/133605 |
| | | | | 348/739 |
| 2014/0204578 A1* | 7/2014 | Kim | ............ | G02F 1/133606 |
| | | | | 362/235 |
| 2014/0376219 A1 | 12/2014 | Ono et al. | | |
| 2015/0226400 A1 | 8/2015 | Wada et al. | | |
| 2016/0201875 A1* | 7/2016 | Kang | ............ | G02B 19/0061 |
| | | | | 362/311.06 |

FOREIGN PATENT DOCUMENTS

| | | | | | |
|---|---|---|---|---|---|
| JP | 2004-235092 | * | 8/2004 | ......... | G02F 1/1335 |
| JP | 2004-235092 A | | 8/2004 | | |
| JP | 2008-270144 A | | 11/2008 | | |
| JP | 2012-212509 | * | 11/2012 | ......... | G02F 1/13357 |
| JP | 2012-212509 A | | 11/2012 | | |
| JP | 2012216762 A | | 11/2012 | | |
| JP | 2013-247038 | * | 12/2013 | ......... | G02F 1/1335 |
| JP | 2013-247038 A | | 12/2013 | | |
| JP | 2013-247039 | * | 12/2013 | ......... | G02F 1/1335 |
| JP | 2013-247039 A | | 12/2013 | | |
| WO | 2008/114882 A1 | | 9/2008 | | |

* cited by examiner

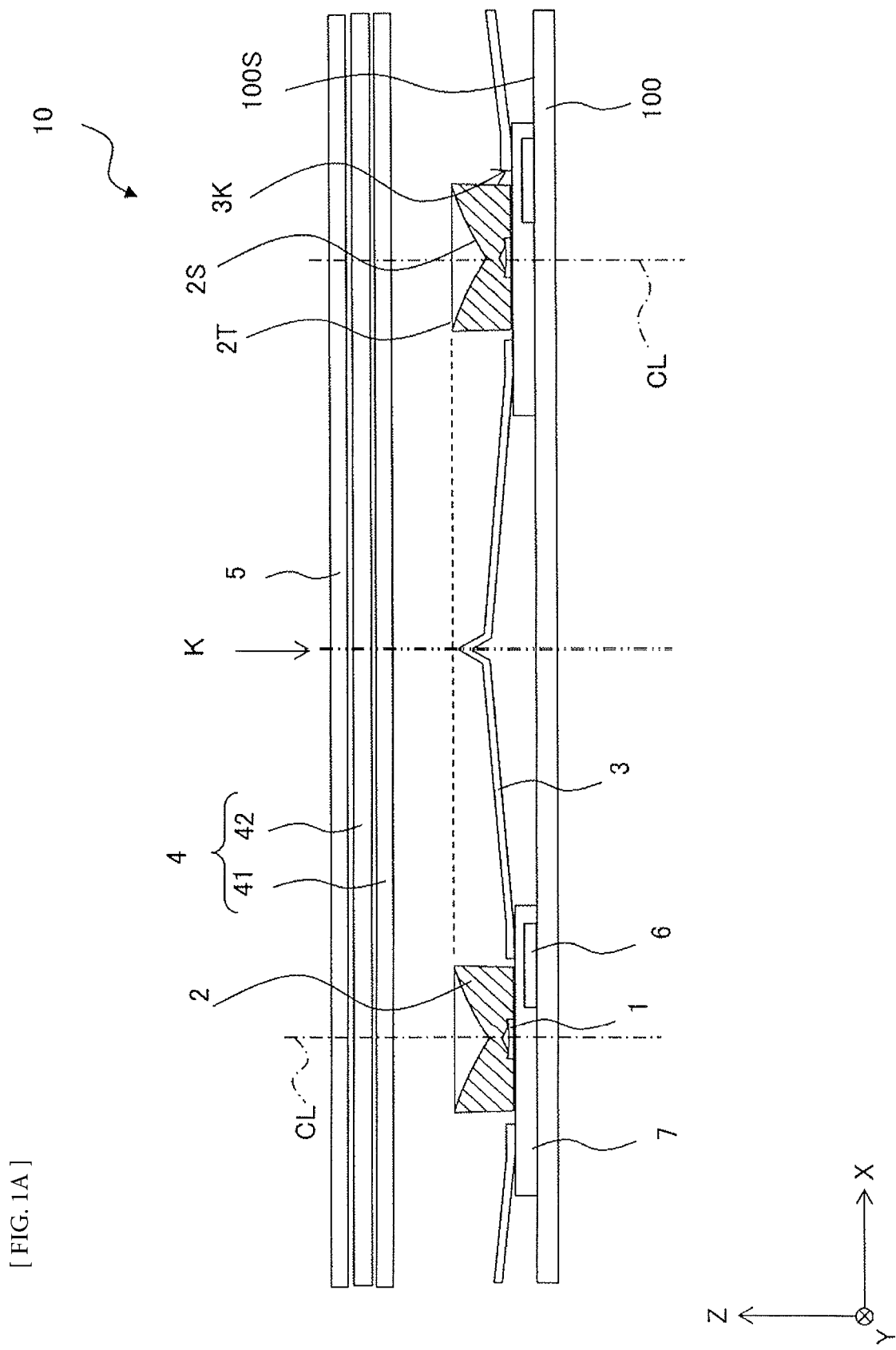
[FIG. 1A]

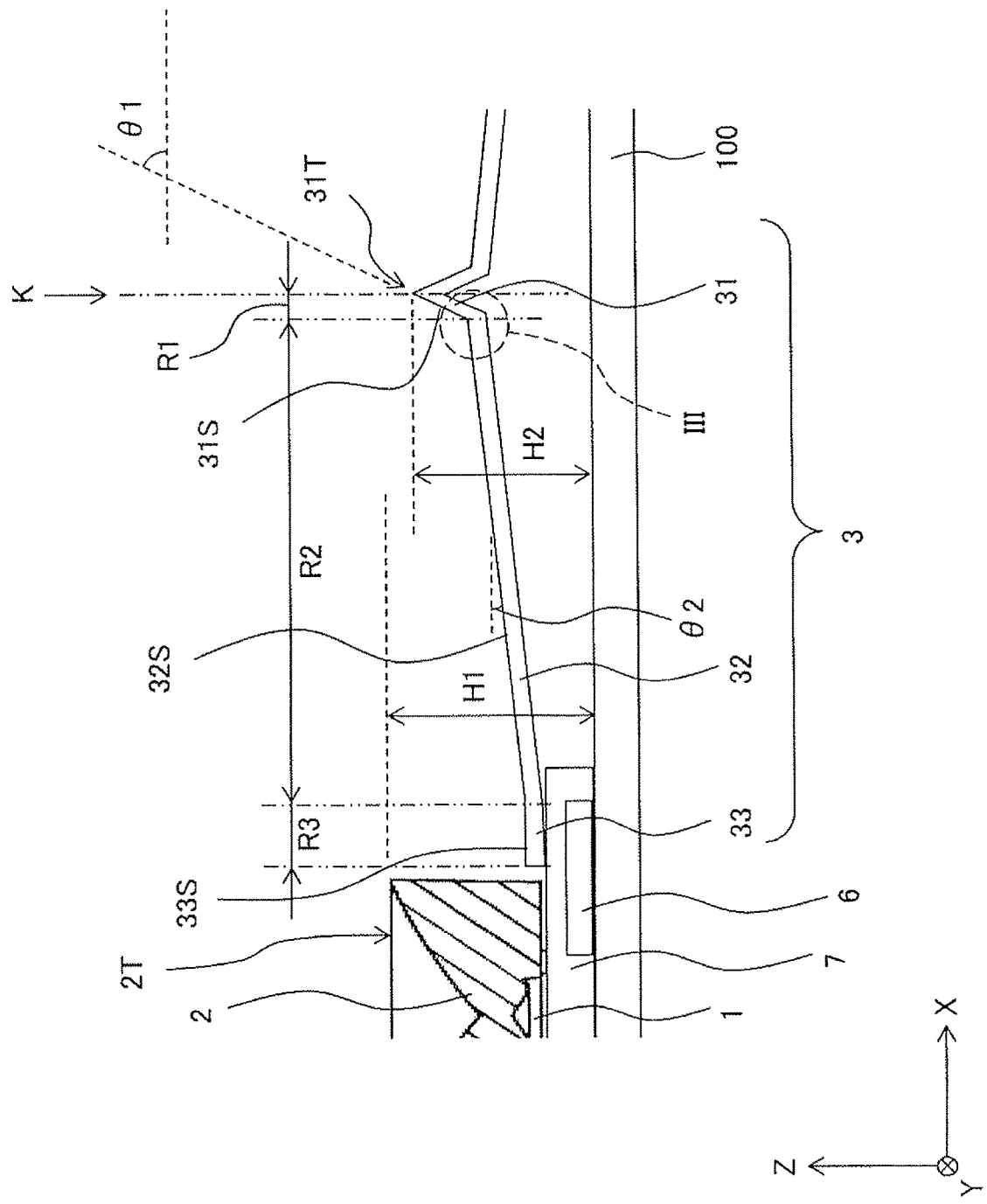
[FIG. 1B]

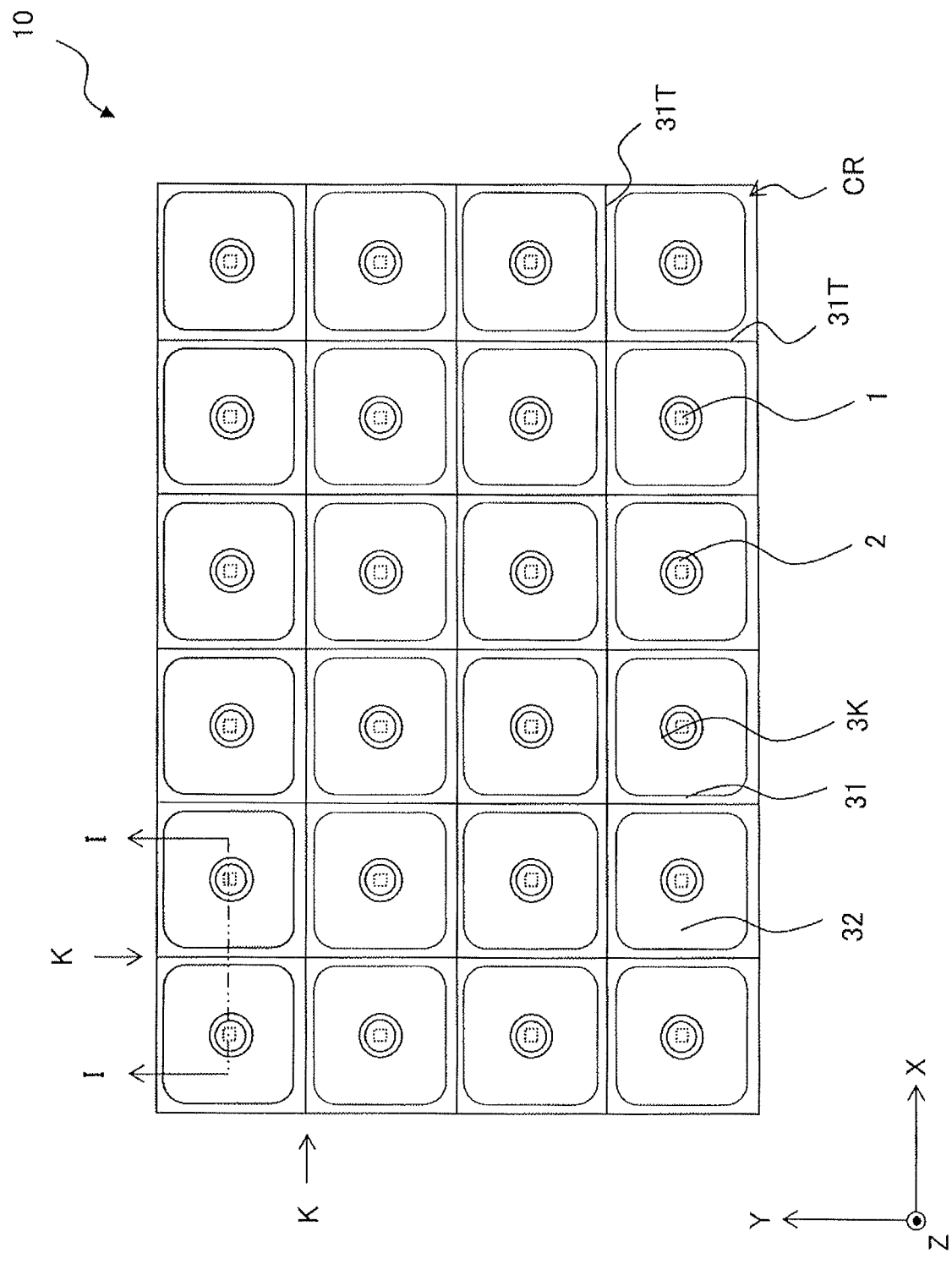
[FIG. 2]

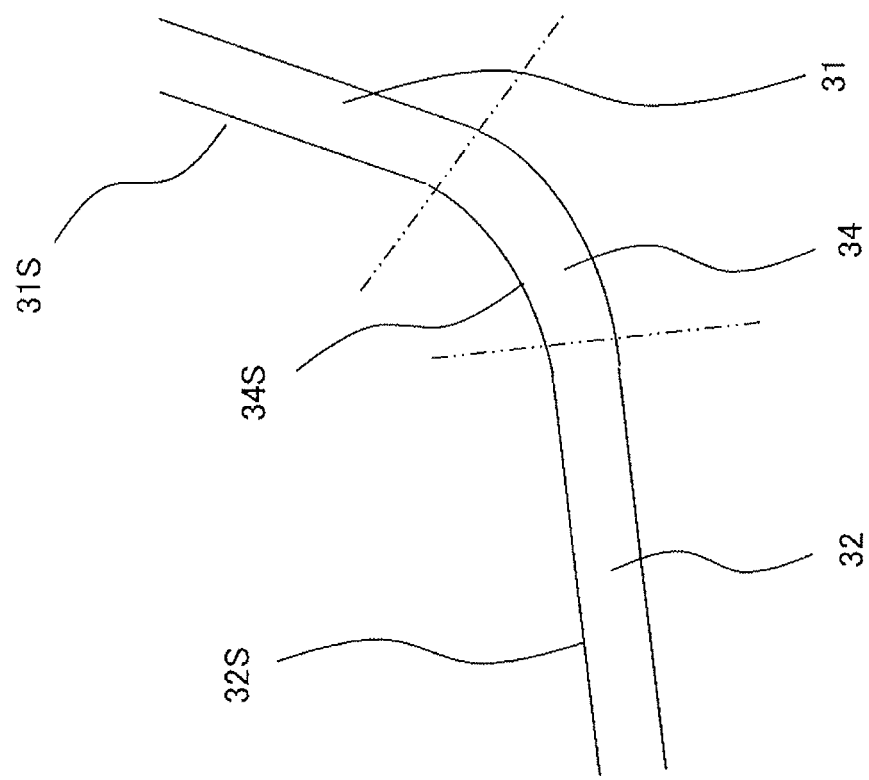
[FIG. 3]

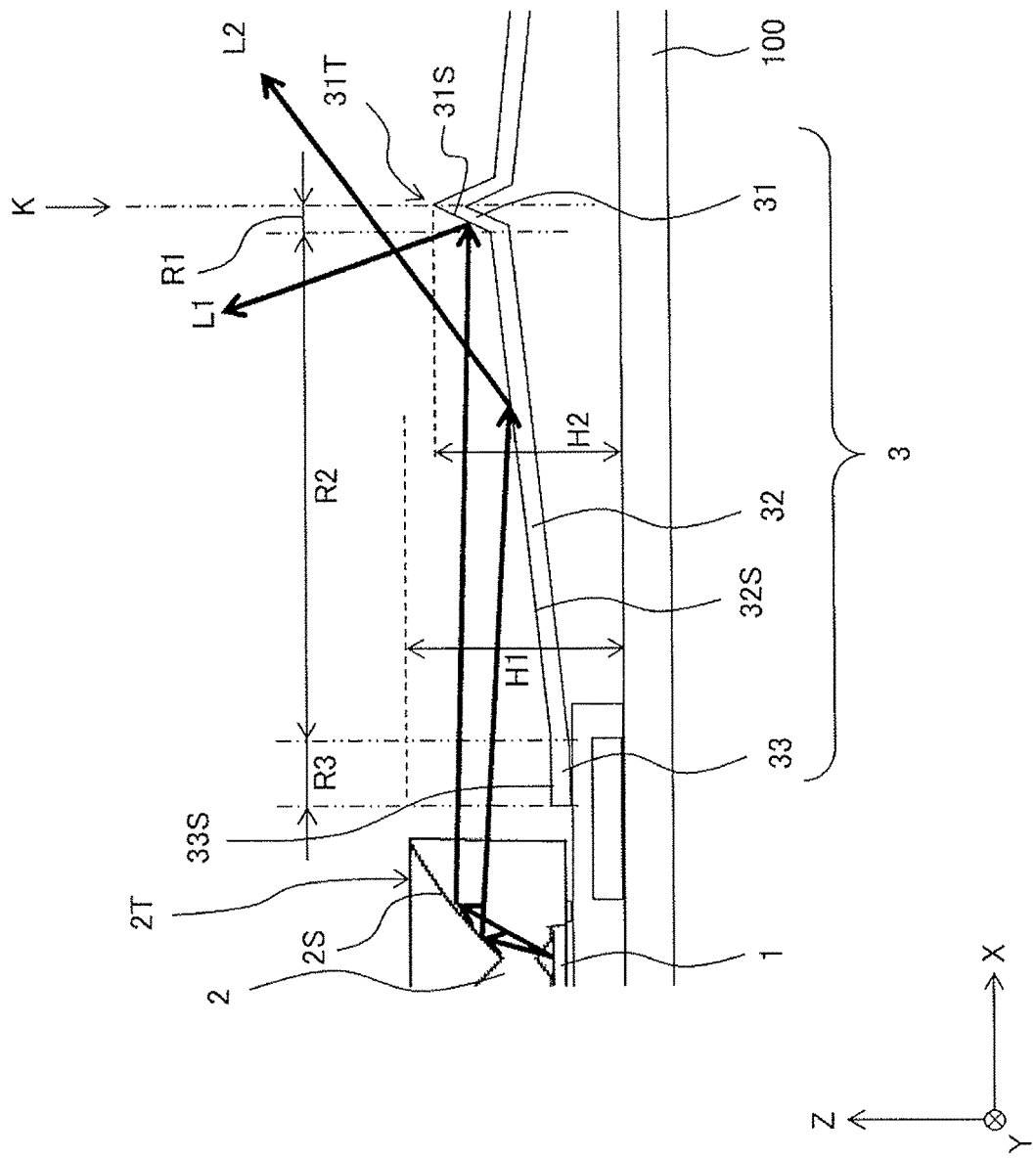
[FIG. 4A]

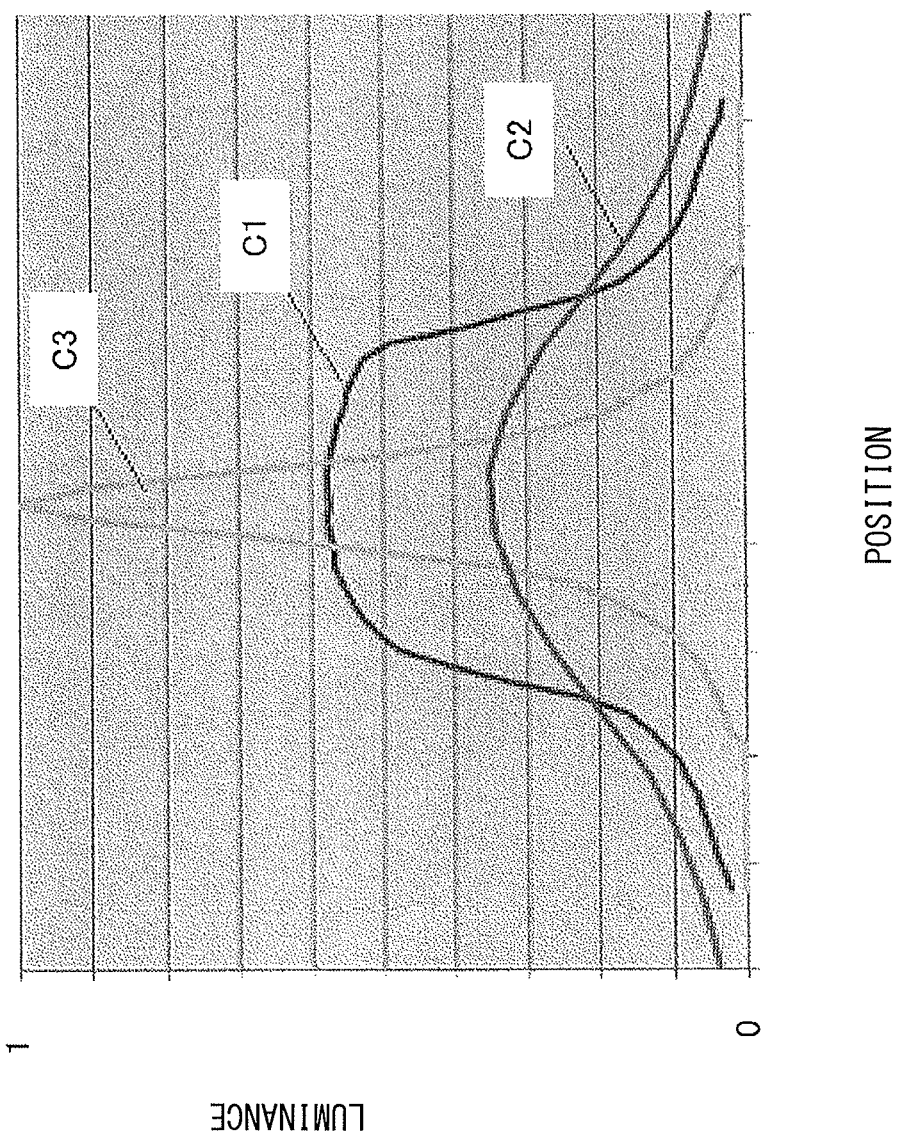
[FIG. 4B]

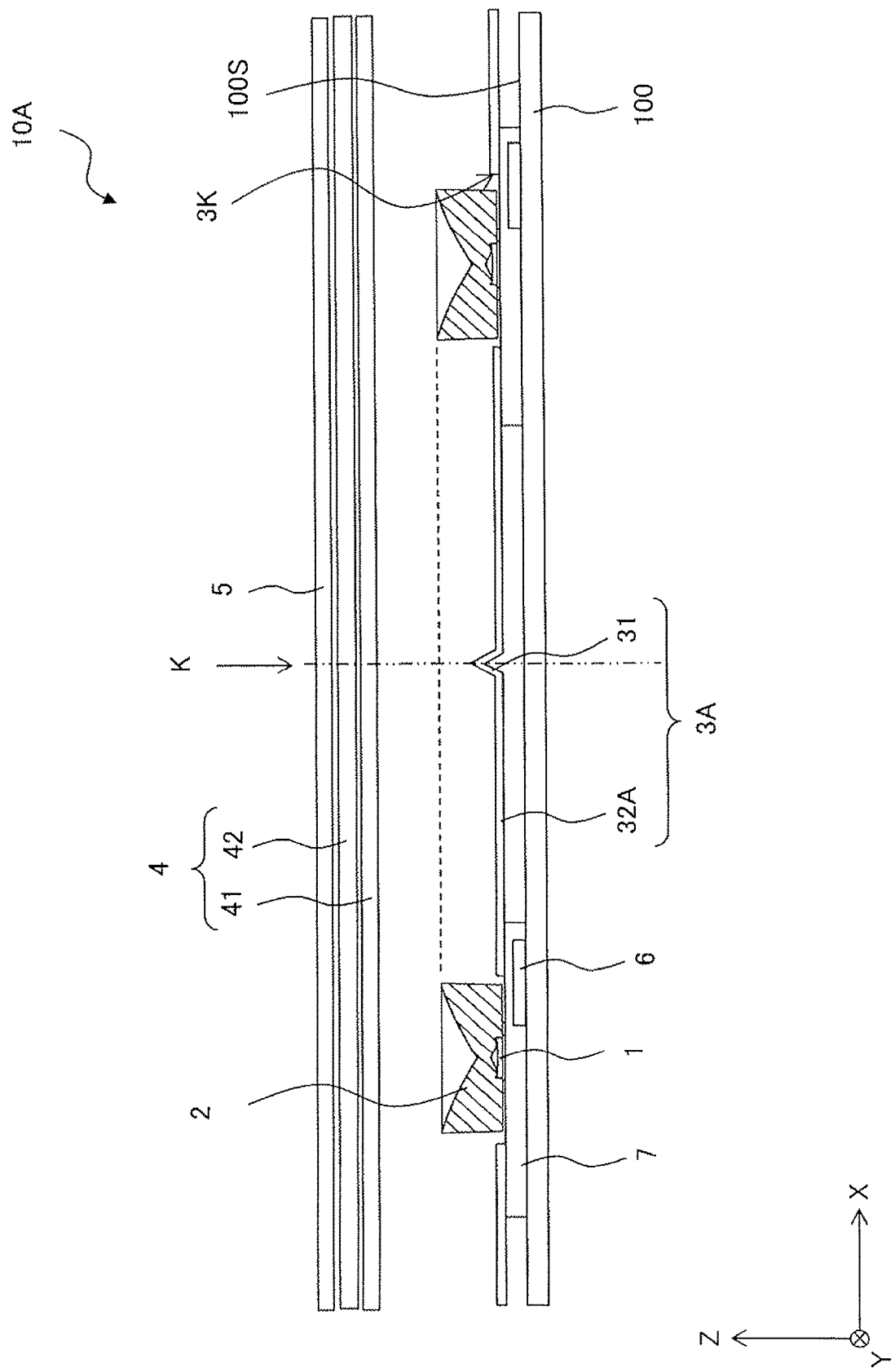

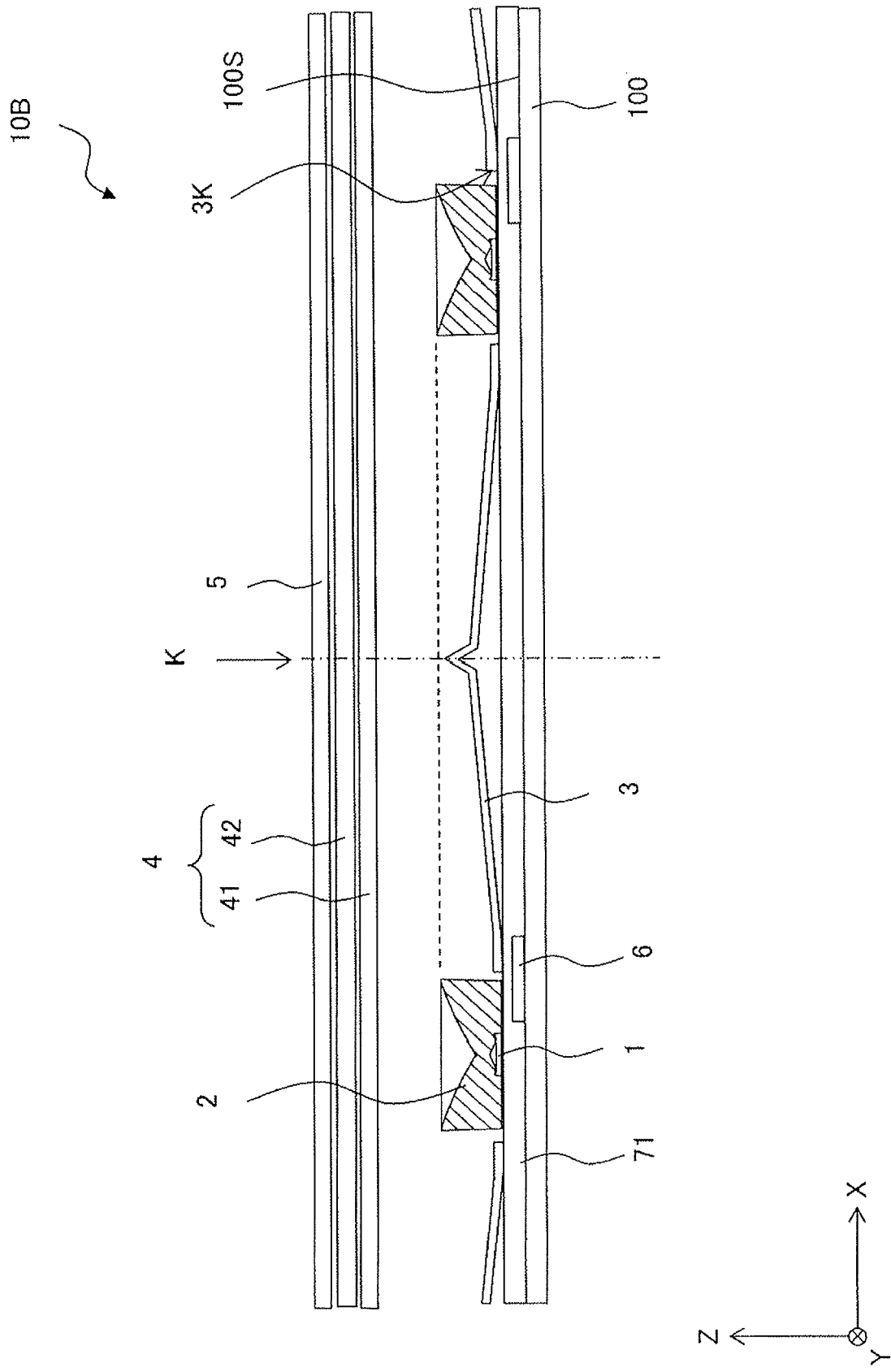
[FIG. 6]

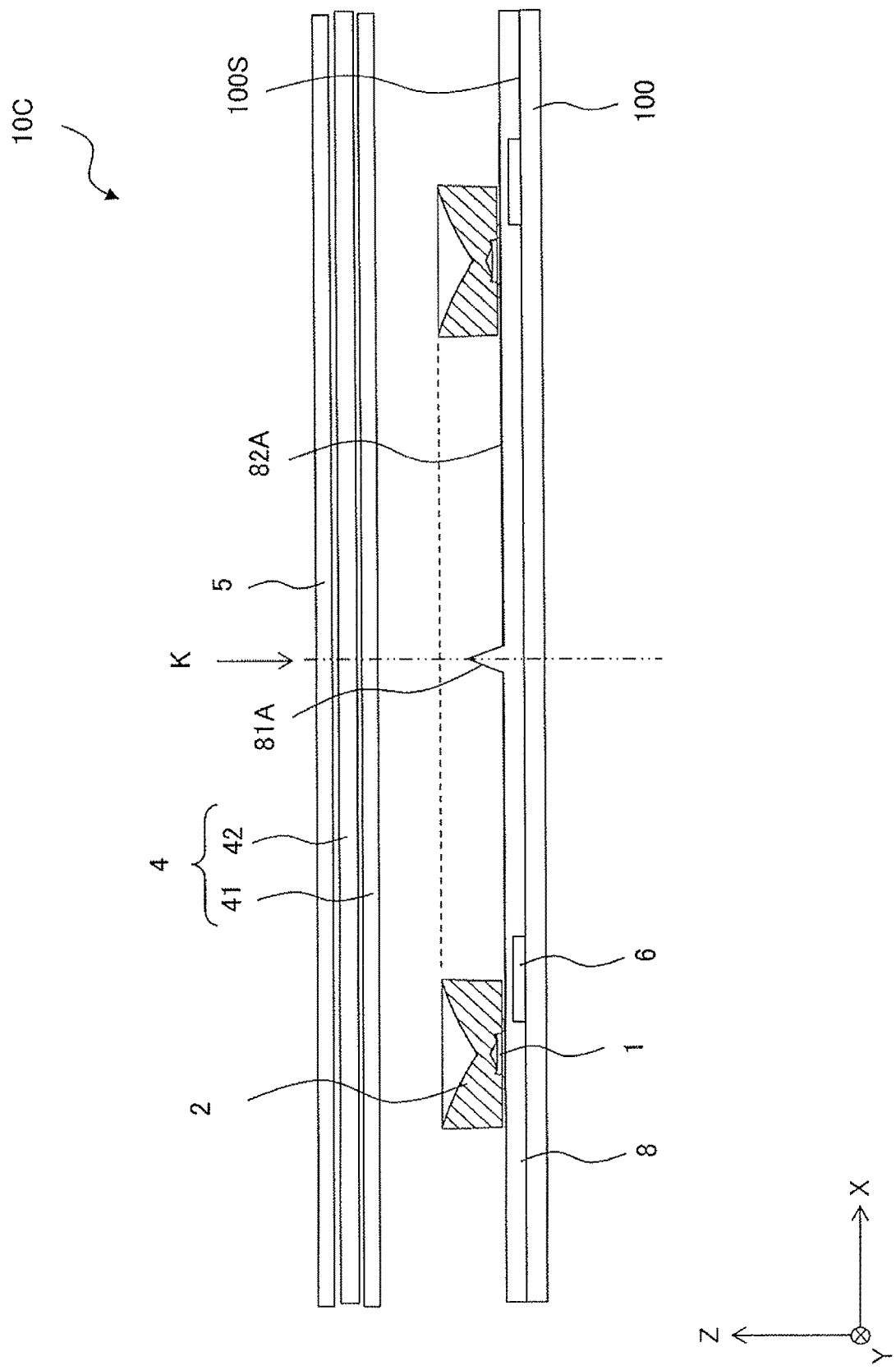
[FIG. 7]

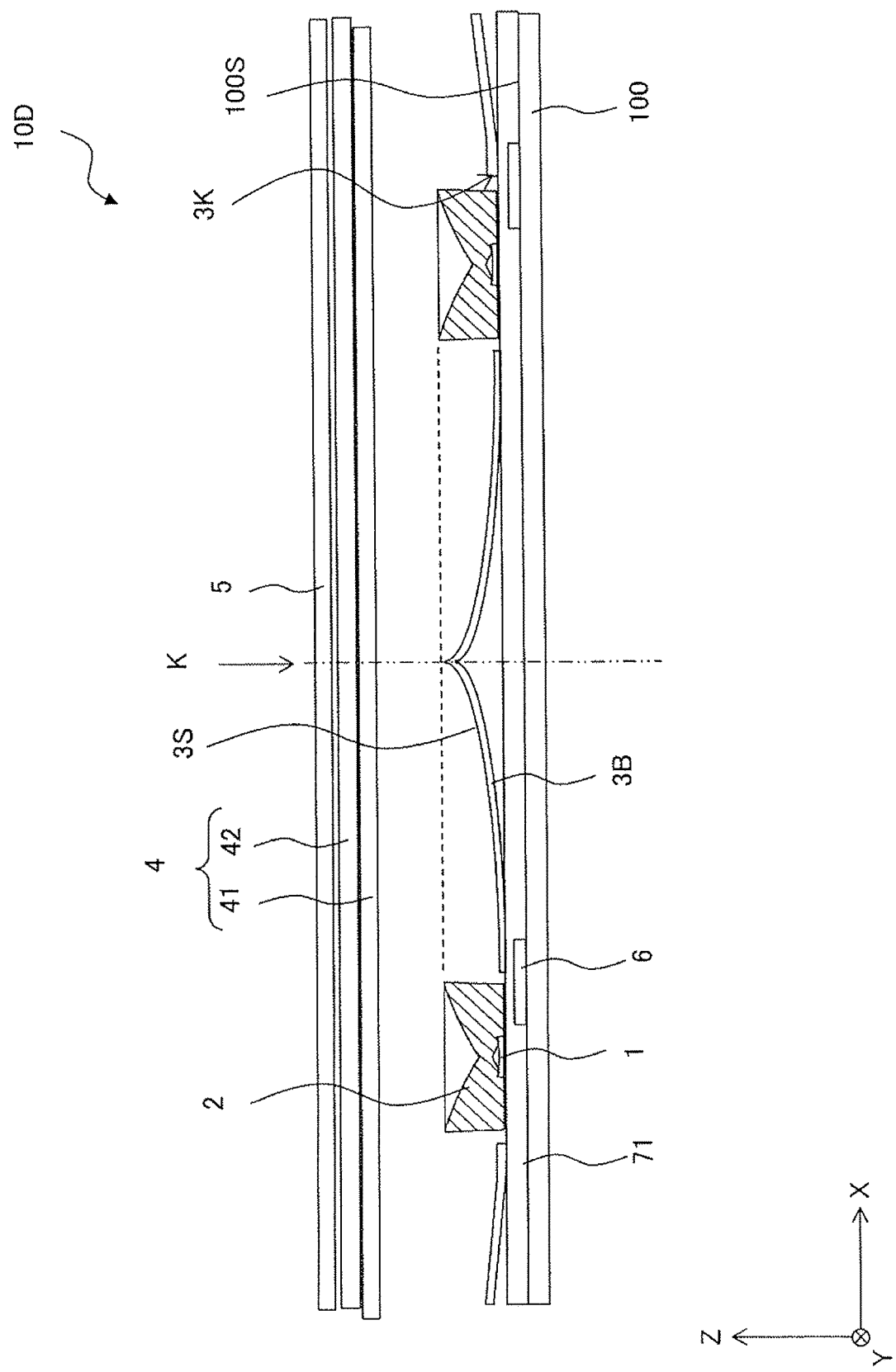
[FIG. 8]

[ FIG. 9 ]
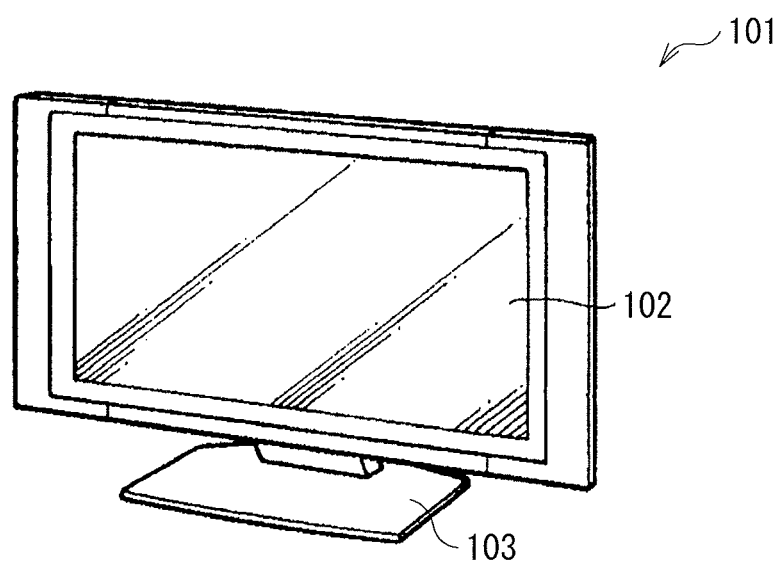

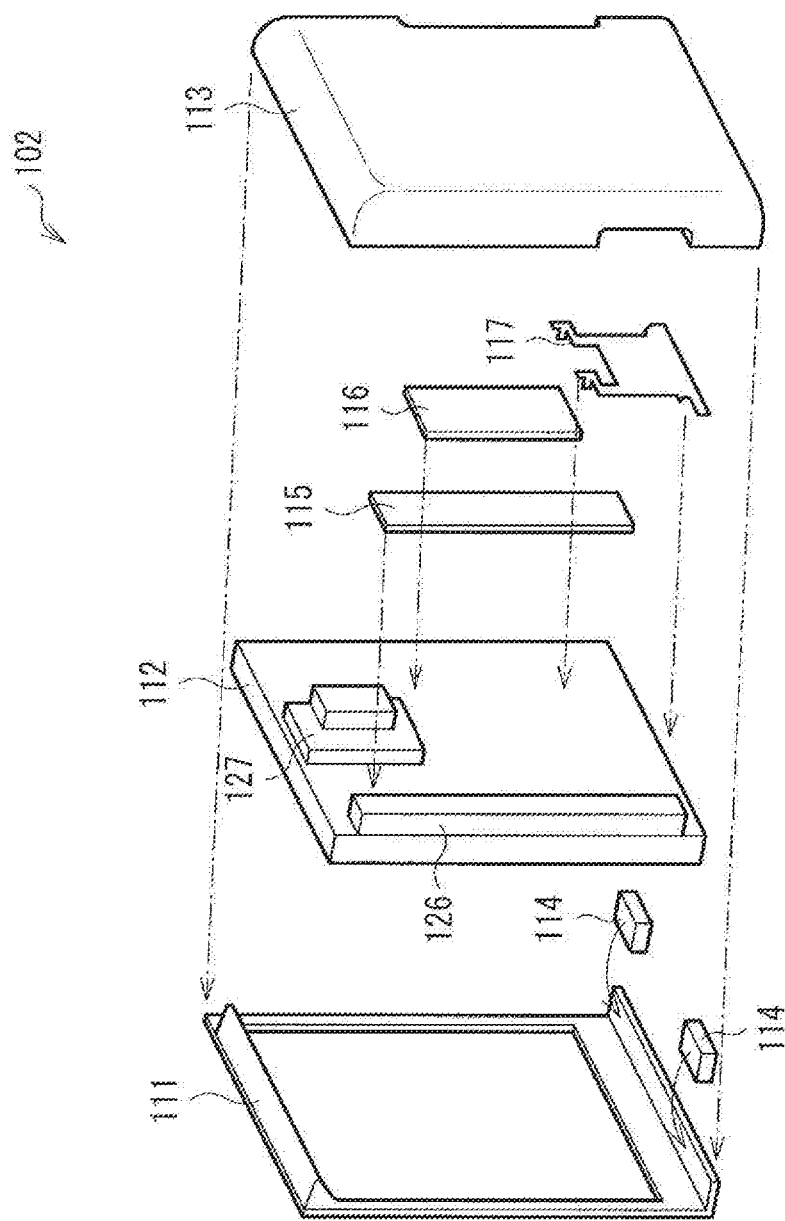

[ FIG. 12A ]
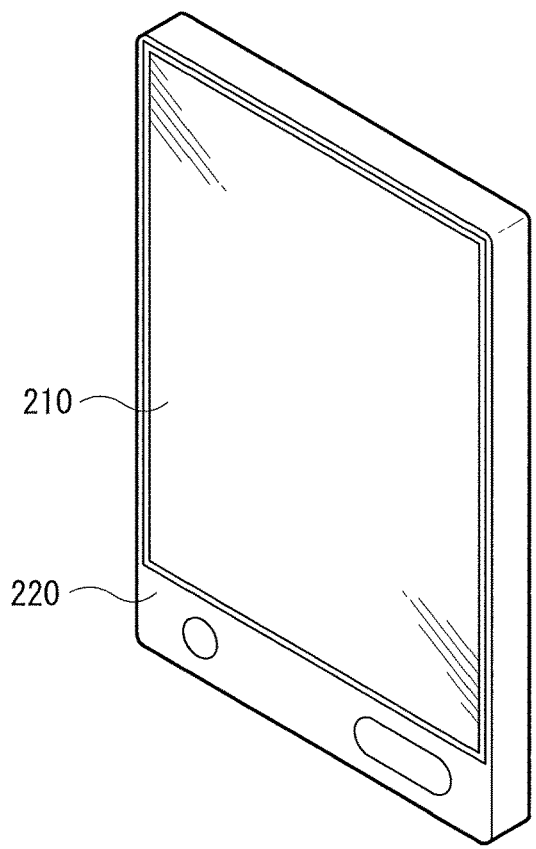
[ FIG. 12B ]
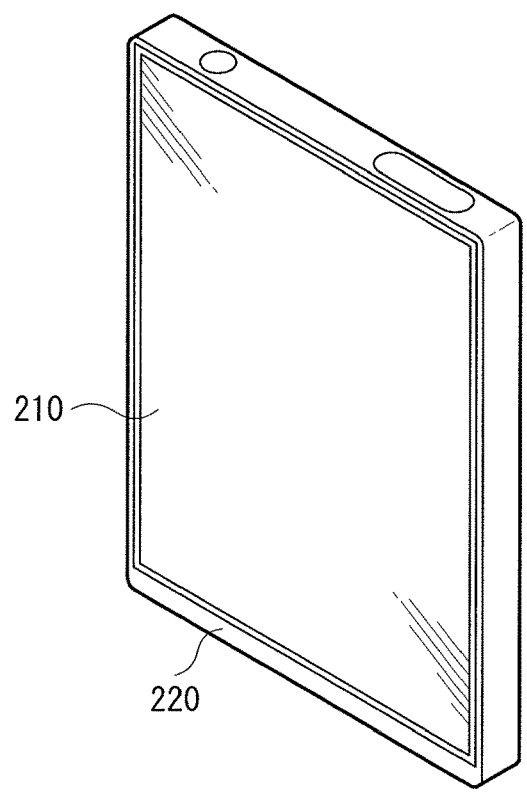

[ FIG. 13 ]
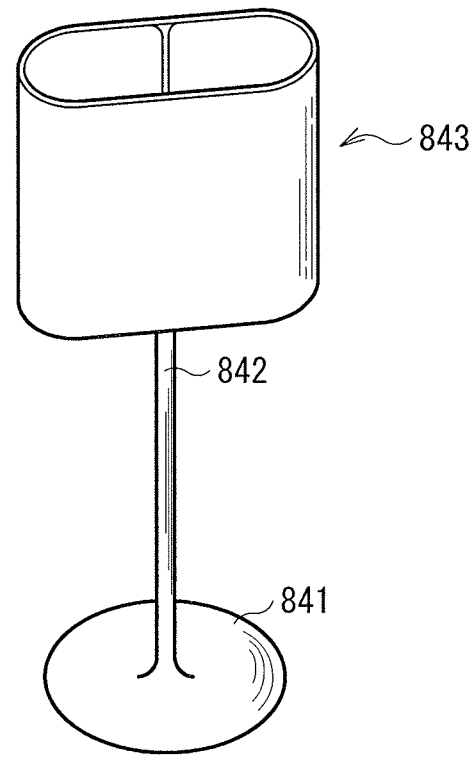
[ FIG. 14 ]
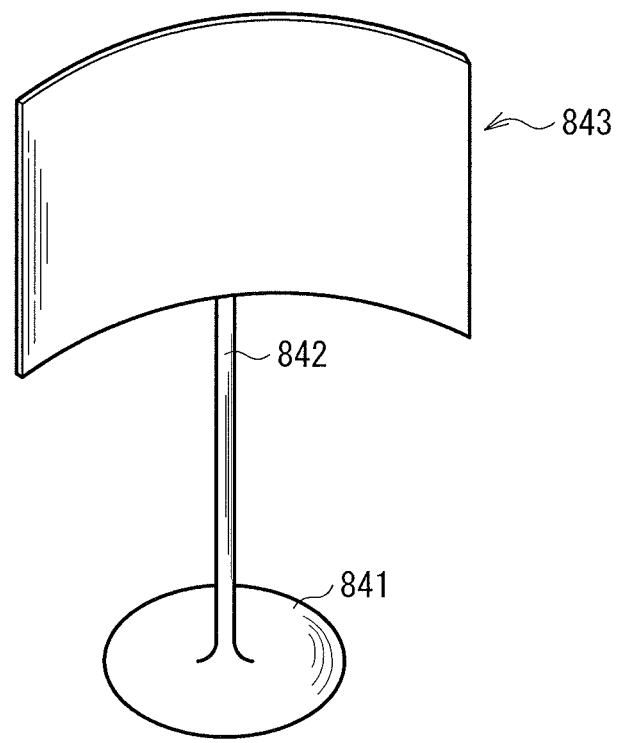

[ FIG. 15 ]
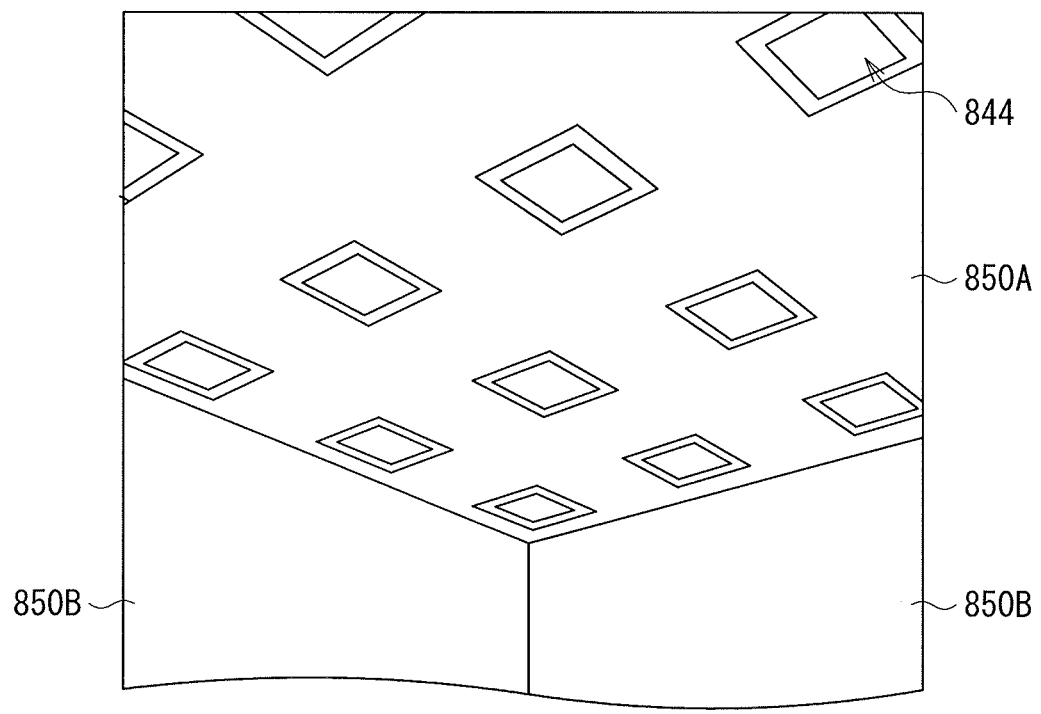

[FIG. 16]
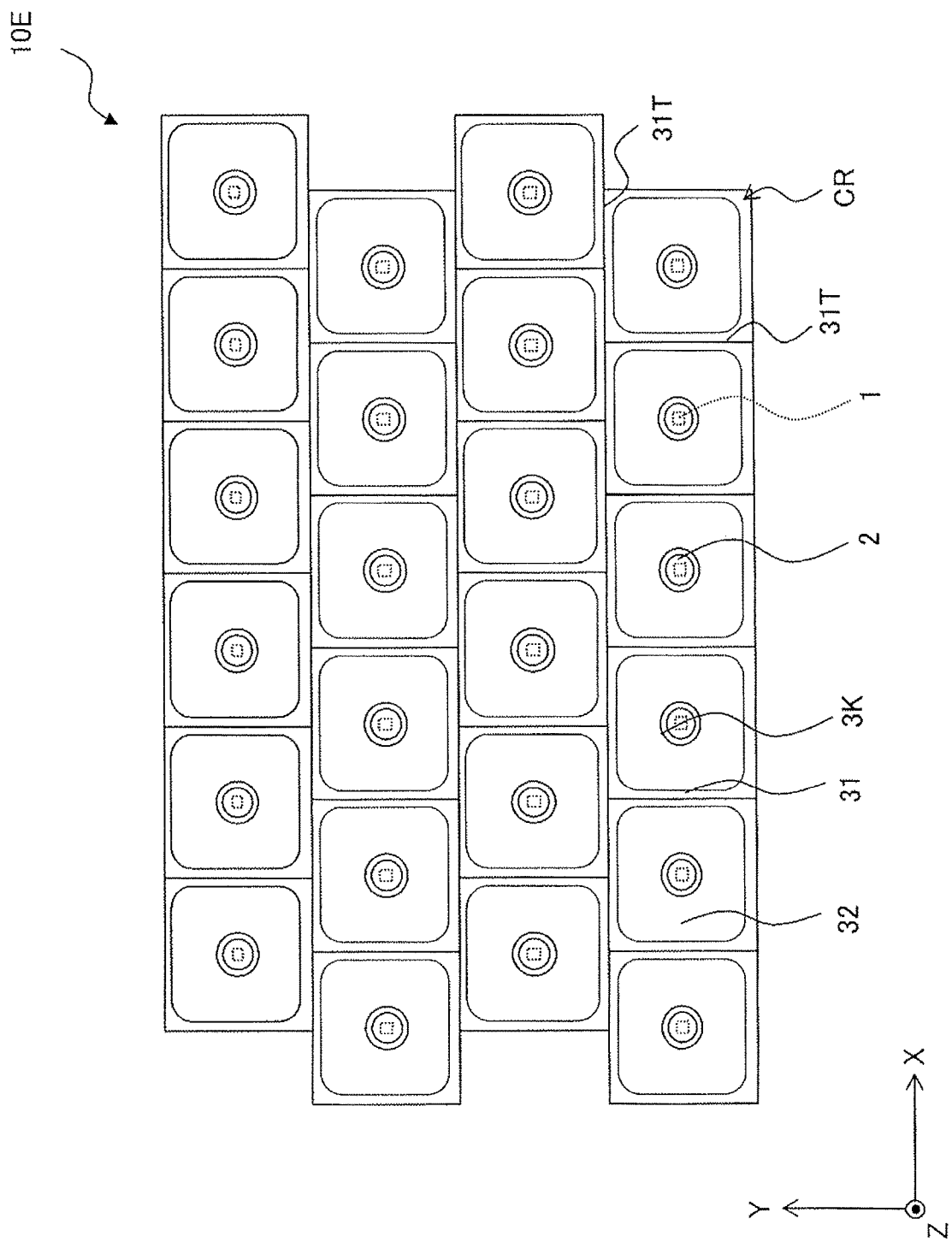

LIGHT-EMITTING DEVICE, DISPLAY APPARATUS, AND LIGHTING APPARATUS

CROSS REFERENCE TO RELATED APPLICATIONS

This application is a U.S. National Phase of International Patent Application No. PCT/JP2016/067927 filed on Jun. 16, 2016, which claims priority benefit of Japanese Patent Application No. JP 2015-128409 filed in the Japan Patent Office on Jun. 26, 2015. Each of the above-referenced applications is hereby incorporated herein by reference in its entirety.

TECHNICAL FIELD

The disclosure relates to a light-emitting device, and to a display apparatus and a lighting apparatus that include such a light-emitting device.

BACKGROUND ART

As a direct backlight to be mounted on a display apparatus such as, for example, a liquid crystal display apparatus, a backlight is known which includes a plurality of light sources that are arranged on a substrate and a plurality of lenses that are disposed directly above the respective light sources and spread light from the light sources over a wide range (for example, see PTLs 1 and 2).

CITATION LIST

Patent Literature

PTL 1: Japanese Unexamined Patent Application Publication No. 2013-247038
PTL 2: Japanese Unexamined Patent Application Publication No. 2013-247039

SUMMARY OF THE INVENTION

However, although luminance uniformity is improved when the light from the respective light sources spreads over the wide range, there are cases where a contrast ratio of a light-on region to a light-off region is not be sufficiently obtained, for example, when partial diving is performed in which some of the plurality of light sources are put on. This is because there is a case where the light from the light source in the light-on region leaks to the light-off region around the light-on region.

It is therefore desirable to provide a light-emitting device that has an excellent light emission performance irrespective of its small thickness, and a display apparatus and a lighting apparatus that include the light-emitting device.

A light-emitting device according to one embodiment of the disclosure includes a substrate, one or more light sources, a reflective lens, a reflective sheet, and a light diffusion member. The substrate has a surface. The one or more light sources are provided on a surface of the substrate, and each have an optical axis. The reflective lens is provided to interpose the light source between the reflective lens and the substrate. The reflective sheet is provided to surround the light source in the surface of the substrate. The reflective sheet includes a first surface. The first surface makes a first angle relative to a plane that is substantially orthogonal to the optical axis to allow the first surface to be away also from the substrate as the first surface is away from the light source. The light diffusion member is provided to interpose the light source, the reflective lens, and the reflective sheet, between the light diffusion member and the substrate. In addition, the display apparatus and the lighting apparatus as respective embodiments of the disclosure each include the above-described light-emitting device.

In the light-emitting device, the display apparatus, and the lighting apparatus according to the respective embodiments of the disclosure, the light source, the reflective lens, the reflective sheet that includes the first surface inclined relative to the plane that is substantially orthogonal to the optical axis, and the light diffusion member are provided. Therefore, light from the reflective lens is reflected by the reflective sheet in, for example, an optical axis direction, while light from the light source is widely diffused by the reflective lens. This suppresses useless light leakage to an emission region where another adjacent light source predominates, for example.

According to the light-emitting device according to the embodiment of the disclosure, it is possible to achieve the excellent light emission performance such as attainment of, for example, both relaxation of a luminance distribution and improvement in a contrast ratio, even in a case where the device is thinned. Therefore, according to the display apparatus using this light-emitting device, it is possible to exhibit excellent picture expression. In addition, according to the lighting apparatus using this light-emitting device, it is possible to selectively and more uniformly illuminate an object. It is to be noted that the effects of the disclosure are not limited to those described above, and may be any of effects that are described in the following.

BRIEF DESCRIPTION OF THE DRAWINGS

FIG. 1A is a schematic cross-sectional view of an overall configuration example of a light-emitting device according to a first embodiment of the disclosure.

FIG. 1B is an enlarged cross-sectional view of a configuration of a main part of the light-emitting device illustrated in FIG. 1A.

FIG. 2 is an enlarged plan view of a planar configuration of the light-emitting device illustrated in FIG. 1A.

FIG. 3 is a further enlarged cross-sectional view of a portion of a main part of the light-emitting device illustrated in FIG. 2.

FIG. 4A is a characteristic diagram illustrating luminance distributions of one light source in the light-emitting device illustrated in FIG. 1A.

FIG. 4B is a characteristic diagram illustrating luminance distributions of one light source in the light-emitting device illustrated in FIG. 1A.

FIG. 5 is a schematic cross-sectional view of a first modification example of the light-emitting device illustrated in FIG. 1A.

FIG. 6 is a schematic cross-sectional view of a second modification example of the light-emitting device illustrated in FIG. 1A.

FIG. 7 is a schematic cross-sectional view of a third modification example of the light-emitting device illustrated in FIG. 1A.

FIG. 8 is a schematic cross-sectional view of a fourth modification example of the light-emitting device illustrated in FIG. 1A.

FIG. 9 is a perspective view of an outer appearance of a display apparatus according to a second embodiment of the disclosure.

FIG. 10 is an exploded perspective view of a main body illustrated in FIG. 9.

FIG. 12A is a perspective view of an outer appearance of a tablet terminal apparatus mounted with the display apparatus according to the disclosure.

FIG. 12B is a perspective view of an outer appearance of another tablet terminal apparatus mounted with the display apparatus according to the disclosure.

FIG. 13 is a perspective view of an outer appearance of a first lighting apparatus that includes the light-emitting device according to the disclosure.

FIG. 14 is a perspective view of an outer appearance of a second lighting apparatus that includes the light-emitting device according to the disclosure.

FIG. 15 is a perspective view of an outer appearance of a third lighting apparatus that includes the light-emitting device according to the disclosure.

FIG. 16 is a schematic cross-sectional view of a fifth modification example of the light-emitting device illustrated in FIG. 1A.

MODES FOR CARRYING OUT THE INVENTION

Figure 11:
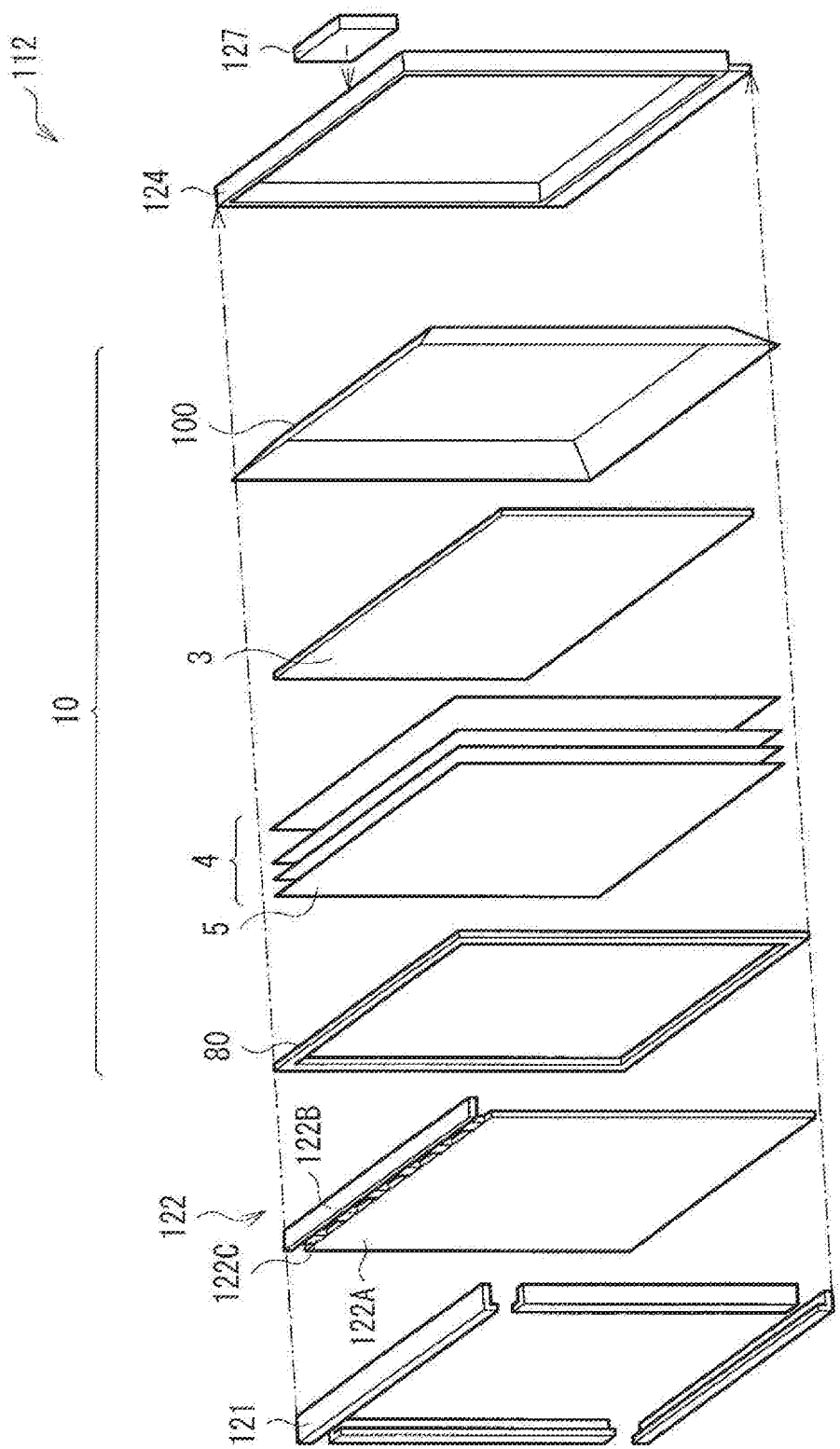
FIG. 11 is an exploded perspective view of a panel module illustrated in FIG. 10.

In the following, some embodiments of the disclosure are described in detail with reference to the drawings. It is to be noted that description is given in the following order.

1. First Embodiment

A light-emitting device that includes a reflective member having two types of slant surfaces that have different angles of inclination 2. First Modification Example of First Embodiment A light-emitting device that includes a reflective member having a flat surface and a slant surface that is disposed upright on an outer edge of the flat surface 3. Second Modification Example of First Embodiment A light-emitting device in which two or more light sources share a light source substrate 4. Third Modification Example of First Embodiment A light-emitting device in which a light source substrate is integrated with a reflective member 5. Fourth Modification Example of First Embodiment A light-emitting device in which a reflective member has a reflecting surface that is formed only by a curved surface 6. Second Embodiment (Display Apparatus: Liquid Crystal Display Apparatus)

7. Application Example of Display Apparatus

8. Application Example of Lighting Apparatus

1. First Embodiment

[Configuration of Light-Emitting Device 10]

FIG. 1A is a schematic cross-sectional view of an overall configuration of a light-emitting device 10 according to a first embodiment of the disclosure. FIG. 1B is an enlarged cross-sectional view of a main part of the light-emitting device 10. FIG. 2 is an enlarged plan view of a planar configuration of a reflective sheet 3 in the light-emitting device 10. In addition, FIG. 3 is an enlarged cross-sectional view of a configuration of the main part (a part surrounded by a broken line and designated by a symbol III) of the light-emitting device 10 illustrated in FIG. 1B. It is to be noted that FIG. 1A corresponds to a cross-section in an arrow direction along a line I-I illustrated in FIG. 2. The light-emitting device 10 is used, for example, as a backlight that illuminates a transmissive liquid crystal panel from behind or as a lighting apparatus in a room, and so forth.

The light-emitting device 10 has a light source 1 provided on an inner surface 100S of a base 100 as a base, a reflective lens 2 provided to interpose the light source 1 between the reflective lens 2 and the base 100, a reflective sheet 3, a diffusion plate 4, and an optical sheet group 5.

In the specification, a distance direction that links the base 100 with the diffusion plate 4 is defined as a Z-direction (a front-back direction), a left-right direction of each of principal planes (widest planes) of the base 100 and the diffusion plate 4 is defined as an X-direction, and a top-bottom direction thereof is defined as a Y-direction.

(Light Source 1)

A plurality of light sources 1 are provided and are arranged, for example, in matrix on the inner surface 100S of the base 100. Each of the plurality of light sources 1 is a point light source having an optical axis CL in a direction (Z-direction) orthogonal to, for example, the inner surface 100S, and is specifically configured by a light emitting diode (LED) that oscillates white light. The plurality of light sources 1 are disposed, one by one, at positions corresponding to a plurality of openings 3K formed, for example, in the reflective sheet 3. The respective light sources 1 are provided, for example, on a plurality of light source substrates 7 in each of which a drive circuit 6 is formed. The drive circuits 6 drive, for example, the respective light sources 1. The plurality of light source substrates 7 are each fixed to the inner surface 100S of the base 100.

(Reflective Sheet 3)

The reflective sheet 3 has a function of exerting optical actions such as reflection, diffusion, scattering, and so forth (in the following, referred to as the reflection and so forth) on incident light. The reflective sheet 3 is provided to surround the light source 1 along the inner surface 100S of the base 100, and has an upper surface that is inclined relative to a plane (an XY plane) that is substantially orthogonal to the optical axis CL to allow the upper surface to be away also from the base 100 as the upper surface is away from the light source 1. More specifically, the reflective sheet 3 has a first region part 31 provided in a first region R1 that surrounds the light source 1, and a second region part 32 that is provided, between the light source 1 and the first region part 31, in a second region R2 that surrounds the light source 1 (see FIG. 1B). The first region part 31 includes a first surface 31S that makes a first angle θ1 relative to the XY plane, and the second region part 32 includes a second surface 32S that makes a second angle θ2 that is smaller than the first angle θ1 relative to the XY plane. The first surface 31S and the second surface 32S are each inclined to be away also from the base 100 as they are each away from the light source 1. It is to be noted that the first surface 31S and the second surface 32S each exert the optical actions such as the reflection and so forth on the light that reaches from the light source 1, for example, via the reflective lens 2, and may be each a flat surface or a curved surface.

It is preferable that the reflective sheet 3 further have a third region part 33 provided in a third region R3 between the light source 1 and the second region part 32. The third region part 33 has a third surface 33S as an upper surface. The third surface 33S also exerts the optical actions such as the reflection and so forth on the light that reaches from the light source 1 via, for example, the reflective lens 2. A lower surface (a surface opposite to the third surface 33S) of the third region part 33 is fixed to an upper surface of the light source substrate 7. That is, the reflective sheet 3 (the third region part 33) is indirectly fixed to the inner surface 100S of the base 100 via the light source substrate 7. The third region part 33 is fixed to the upper surface of the light source substrate 7 in this way, thus making it possible to prevent the light from the reflective lens 2 from leaking through a gap formed between the third region part 33 and the light source substrate 7 downward below the reflective sheet 3. It is to be noted that the reflective sheet 3 (the third region part 33) may be directly fixed to the inner surface 100S of the base 100. Also in this case, it is possible to prevent the light from the reflective lens 2 from leaking downward below the reflective sheet 3.

In addition, it is desirable that the reflective sheet 3 further have a fourth region part 34 between the first region part 31 and the second region part 32 as illustrated in FIG. 3. The fourth region part 34 includes a fourth surface 34S formed by a curved surface that joins the first surface 31S with the second surface 32S. The fourth surface 34S also exerts the optical actions such as the reflection and so forth on the light that reaches from the light source 1 via the reflective lens 2. Presence of the fourth surface 34S formed by the curved surface allows for suppression of appearance of an intense luminance peak in a luminance distribution of the light emitted from the light source 1. The reason for this is described later.

The first region part 31 includes an outermost edge 31T that is located at a position that is the most distant from a rear housing 124 and the light source substrate 7, for example, in the Z-direction on the reflective sheet 3. That is, the outermost edge 31T forms a projection that projects in the Z-direction on the reflective sheet 3. In addition, the outermost edge 31T is located at a position that is the most distant from the light source 1 and the reflective lens 2 on the XY plane. In addition, the outermost edge 31T is provided in a lattice shape on the XY plane (see FIG. 2). Accordingly, one light source 1 is disposed in a cell region CR that is one block surrounded by the outermost edge 31T that extends in the X-direction and the outermost edge 31T that extends in the Y-direction. That is, the outermost edge 31T extends along a boundary K between the cell regions CR that are adjacent to each other.

It is preferable that the reflective sheet 3 be the one in which the first to fourth region parts 31 to 34 are integrally molded by, for example, injection molding, hot press molding, and so forth. Examples of constituent materials of the reflective sheet 3 include polycarbonate resins, acrylic resins such as a polymethyl methacrylate resin (PMMA), polyester resins such as polyethylene terephthalate, amorphous copolymer polyester resins such as MS (copolymers of methyl methacrylate and styrene), polystyrene resins, and polyvinyl chloride resins.

(Reflective Lens 2)

The reflective lens 2 has a reflecting surface 2S, and functions to reflect the light from the light source 1 laterally on the reflecting surface 2S. That is, the reflective lens 2 is able to spread the light across a wide range on the XY plane. Further, as illustrated in FIG. 1B and so forth, the reflective lens 2 has an upper end edge 2T located, for example, at a position of a first height H1 from the inner surface 100S of the base 100. The outermost edge 31T of the first region part 31 is located at a position of a second height H2. It is preferable that the second height H2 be lower than the first height H1.

(Diffusion Plate 4)

The diffusion plate 4 is configured, for example, by stacking, in the Z-direction, a first diffusion plate 41 on which a plurality of lenticular lenses that extend in the X-direction are formed to be arranged in the Y-direction and a second diffusion plate 42 on which the plurality of lenticular lenses that extend in the Y-direction are formed to be arranged in the X-direction.

(Optical Sheet Group 5)

The optical sheet group 5 is formed by stacking a plurality of sheet members such as, for example, a diffusion sheet, a lens film, and a polarization separation sheet. However, the sheets are illustrated as one integral member in FIG. 1A.

[Workings and Effects of Light-Emitting Device 10]

The light source 1 is the point light source, and thus the light emitted from the light source 1 travels from a light emitting point of the light source 1 toward the reflective lens 2 while spreading in all directions. The light is reflected by the reflecting surface 2S of the reflective lens 2, and then is subjected to the optical actions such as the reflection and so forth on the first to fourth surfaces 31S to 34S of the reflective sheet 3. Thereafter, the light travels toward the diffusion plate 4 and the optical sheet group 5. In addition, a portion of the light that has temporarily reached the diffusion plate 4 becomes return light that returns without being transmitted through the diffusion plate 4. Thereafter, the return light is again subjected to the reflection and so forth by the reflective sheet 3, and then again travels to the diffusion plate 4. Finally, the light passes through the diffusion plate 4 and the optical sheet group 5 to be observed as emitted light outside the optical sheet group 5 (side opposite to the light source 1). Here, in the light-emitting device 10 according to the embodiment, the reflective sheet 3 provided to surround the light source 1 includes the first surface 31S that makes the first angle θ1 to allow the first surface 31S to be away also from the base as it is away from the light source 1. Consequently, as illustrated in FIG. 4A, for example, a portion of the light emitted from the light source 1 is reflected by the reflecting surface 2S, then reaches the first surface 31S, and is subjected to the reflection and so forth on the first surface 21S to be light L1 that goes forward in a direction directly above that light source 1. In contrast, another portion of the light emitted from the light source 1 is reflected by the reflecting surface 2S, then reaches, for example, the second surface 32S, and is subjected to the reflection and so forth on the second surface 32S to be light L2 that appropriately spreads out. Here, the light-emitting device 10 has a configuration in which the second surface 32S makes the second angle θ2, thus making it possible to appropriately suppress the light that spreads directly above the adjacent cell region CR.

In the light-emitting device 10, such actions brought by the reflective sheet 3 allows for a luminance distribution as a curve C1 illustrated in FIG. 4B, for example. In FIG. 4B, the horizontal axis indicates a position on the XY plane, that is, a distance from the light emitting point of the light source 1, and the vertical axis indicates a luminance. In addition, in FIG. 4B, a curve C2 indicates the luminance distribution of a light-emitting device having a configuration in which the reflective sheet 3 is removed from the light-emitting device 10. A curve C3 indicates the luminance distribution of a light-emitting device having a configuration in which the reflective sheet 3 is removed from the light-emitting device 10 and the reflective lens 2 is replaced with a refractive lens. It is to be noted that the curves C1 to C3 in FIG. 4B each indicate the luminance distribution obtained at a stage before transmission through the diffusion plate 4. As indicated by the curve C1, in the light-emitting device 10, high luminance is obtained in a relatively wide range corresponding to the cell region CR, and the luminance is abruptly lowered at a position that is distant away to a certain extent from the light source 1. In contrast, in the curve C2, a change in luminance is gentle, and a boundary between a high-luminance region and a low-luminance region is unclear. Further, in the curve C3, although a peak value of the luminance is high, the high-luminance region is extremely narrow.

Such actions causes the light-emitting device 10 mounted with the reflective sheet 3 to allow for light collection to a region to be desired to be illuminated while increasing front luminance by efficiently utilizing the light from the light source 1, thus making it possible to achieve improvement in an area contrast performance It is to be noted that there is a possibility that luminance unevenness (lattice-shaped dark lines) may occur due to a reduction in luminance in the vicinity of the outermost edge 31T, due to the outermost edge 31T provided on the XY plane in the lattice shape. However, in the light-emitting device 10, the diffusion plate 4 that is configured by stacking the first diffusion plate 41 and the second diffusion plate 42 is provided above the reflective sheet 3. This allows for diffusion of the light that enters the diffusion plate 4 in the XY plane, thus making it possible to eliminate the luminance unevenness caused by the outermost edge 31T. Accordingly, flattening of the luminance unevenness in the XY plane in the entire light-emitting device 10 is achieved in order that a boundary between the light and light from the light source 1 in another adjacent cell region CR may not clearly appear.

In addition, in the reflective sheet 3, the first surface 31S and the second surface 32S are joined together with the fourth surface 34S that is formed by the curved surface, thus making it possible to suppress appearance of the intense luminance peak in the luminance distribution of the light emitted from the light sources 1. This is because it is possible to weaken the luminance peak at an overlapping portion of the luminance distribution of the light L1 subjected to the reflection and so forth on the first surface 31S and the luminance distribution of the light L2 subjected to the reflection and so forth on the second surface 32S.

According to such a light-emitting device 10, even in a case where the entire light-emitting device 10 is thinned, it is possible to achieve the excellent light emission performance such as attainment of, for example, both relaxation (luminance uniformization) of the luminance distribution and improvement in the contrast ratio during partial driving. Therefore, according to the display apparatus using the light-emitting device 10, it is possible to exhibit excellent picture expression. In addition, according to the lighting apparatus using this light-emitting device, it is possible to selectively perform more uniform lighting on the object.

2. First Modification Example of First Embodiment

[Configuration and Workings and Effects of Light-Emitting Device 10A Including Reflective Sheet 3A]

In the present embodiment, the second region R2 may include a second region part 32A that extends along the XY plane, as in, for example, the reflective sheet 3A as a first modification example illustrated in FIG. 5. Also in this case, presence of the first region part 31 makes it possible to form the light L1 that travels in the direction directly above the light source 1. Accordingly, also in the light-emitting device 10A that includes the reflective sheet 3A, it is possible to promote attainment of both the relaxation (the luminance uniformization) of the luminance distribution and the improvement in the contrast ratio during partial driving.

3. Second Modification Example of First Embodiment

[Configuration and Workings and Effects of Light-Emitting Device 10B Including Common Light Source Substrate 71]

In the present embodiment, the common light source substrate 71 that is shared among two or more light sources 1 may be provided in place of the light source substrate 7 as in the light-emitting device 10B illustrated in FIG. 6. For example, a plurality of light source units are produced in advance by fixing the plurality of light sources 1 to the belt-shaped light source substrate 71 to be arranged at predetermined spacing intervals along a longitudinal direction thereof, and then the light source units are arranged in the housing 100. This makes it possible to achieve streamlining of assembly work.

4. Third Modification Example of First Embodiment

[Configuration and Workings and Effects of Light-Emitting Device 10C Including Optical Substrate 8 in which Light Source Substrate is Integrated with Reflective Member]

In the present embodiment, an optical substrate 8 in which the light source substrate 7 is integrated with the reflective sheet 3 may be provided in place of provision of the light source substrate 7 and the reflective sheet 3, as in the light-emitting device 10C illustrated in FIG. 7. A projection including a slant surface 81A is formed in the vicinity of the boundary K on the optical substrate 8. The slant surface 81A brings an action similar to that of the first surface 31S of the first region part 31 illustrated in FIG. 1B and so forth. Accordingly, also in the light-emitting device 10C, it is possible to promote the attainment of both the relaxation (the luminance uniformization) of the luminance distribution and the improvement in the contrast ratio during partial driving.

5. Fourth Modification Example of First Embodiment

[Configuration and Workings and Effects of Light-Emitting Device 10D]

The light-emitting device 10D according to this modification example includes a reflective sheet 3B having a reflecting surface 3S that is formed only by a curved surface, as illustrated in FIG. 8. Also in this case, it is possible to promote the attainment of both the relaxation (the luminance uniformization) of the luminance distribution and the improvement in the contrast ratio during partial driving by appropriately setting a curved shape of the reflecting surface 3S in order that a desirable luminance distribution may be obtained.

6. Second Embodiment

FIG. 9 illustrates an outer appearance of a display apparatus 101 according to a second embodiment of the technology. The display apparatus 101 includes the light-emitting device 10, and is used, for example, as a thin television. The display apparatus 101 has a configuration in which a flat-shaped main body 102 for image display is supported by a stand 103. It is to be noted that the display apparatus 101 is placed on a horizontal plane such as a floor, a rack, a stand, and so forth, and is used as the stationary one in a state of attaching the stand 103 to the main body 102. However, it is also possible to use the display apparatus 101 as the wall-mounted one in a state of detaching the stand 103 from the main body 102.

FIG. 10 illustrates the main body 102 illustrated in FIG. 9 in an exploded state. The main body 102 includes, for example, from front side (viewer side), a front exterior member (a bezel) 111, a panel module 112, and a rear external member (a rear cover) 113 in this order. The front exterior member 111 is a frame-shaped member that covers a front peripheral part of the panel module 112, and a pair of speakers 114 is disposed at the lower part thereof. The panel module 112 is fixed to the front exterior member 111, and a power source substrate 115 and a signal substrate 116 are mounted on a rear surface of the panel module 112, with a metal fitting 117 being fixed to the rear surface. The metal fitting 117 is used for fitting of a wall-mounted bracket, fitting of the substrate and so forth, and fitting of the stand 103. The rear exterior member 113 covers the rear surface and side faces of the panel module 112.

FIG. 11 illustrates the panel module 112 illustrated in FIG. 10 in the exploded state. The panel module 112 includes, from front side (viewer side), a front housing (a top chassis) 121, a liquid crystal panel 122, a frame-shaped member (a middle chassis) 80, the optical sheet group 5, the diffusion plate 4, the reflective sheet 3, the base 100 provided with the light sources 1 and the reflective lenses 2, a rear housing (a back chassis) 124, and a timing controller substrate 127 in this order, for example. However, illustration of the light sources 1 and the reflective lenses 2 is omitted in FIG. 11.

The front housing 121 is a frame-shaped metal component that covers the front peripheral part of the liquid crystal panel 122. The liquid crystal panel 122 includes, for example, a liquid crystal cell 122A, a source substrate 122B, and a flexible substrate 122C such as a chip on film (COF) that couples these component parts. The frame-shaped member 123 is a frame-shaped resin-made component that holds the liquid crystal panel 122 and an optical sheet 50. The rear housing 124 is a metal component made of iron (Fe) and so forth and accommodates the liquid crystal panel 122, a middle housing 123, and the light-emitting device 10. The timing controller substrate 127 is also mounted on a rear surface of the rear housing 124.

In the display apparatus 101, image display is performed by causing the liquid crystal panel 122 to selectively transmitting the light from the light-emitting device 10. Here, the display apparatus 101 includes the light-emitting device 10 that achieves improvement in uniformity of the in-plane luminance distribution as described in the first embodiment, thus leading to improvement in the display quality of the display apparatus 101.

7. Application Example of Display Apparatus

In the following, an application example of the display apparatus 101 as described above to electronic apparatuses is described. Examples of the electronic apparatuses include a television, a digital camera, a notebook personal computer, a mobile terminal apparatus such as a mobile phone, and a video camera. In other words, the above-described display apparatus is applicable to electronic apparatuses in every field that display externally inputted image signals or internally generated image signals as images or pictures.

FIG. 12A illustrates an external appearance of a tablet terminal apparatus to which the display apparatus 101 of the foregoing embodiment is applicable. FIG. 12B illustrates an external appearance of another tablet terminal apparatus to which the display apparatus 101 of the foregoing embodiment is applicable. Each of these tablet terminal apparatuses includes, for example, a display section 210 and a non-display section 220, and the display section 210 is configured by the display apparatus 101 of the foregoing embodiment.

8. Application Examples of Lighting Apparatus

Each of FIGS. 13 and 14 illustrates an external appearance of a tabletop lighting apparatus to which the light-emitting device 10 of the foregoing embodiment is applicable. Each of these lighting apparatuses includes, for example, an illuminating section 843 attached to a support post 842 that is provided on a base 841. The illuminating section 843 is configured by any of the light-emitting devices 10 and 20 according, respectively, to the foregoing first and second embodiments. It is possible for the illuminating section 843 to take any shape such as a tubular shape illustrated in FIG. 13 and a curved surface shape illustrated in FIG. 14, by configuring components such as a substrate 2, the reflective plate 3, and an optical sheet 4 in curved shapes.

FIG. 15 illustrates an external appearance of an indoor lighting apparatus to which the light-emitting device 10 of the foregoing embodiments is applicable. The lighting apparatus includes an illuminating section 844 that is configured by any of the light-emitting devices 1 and 2 according to the foregoing embodiments, for example. The appropriate number of the illuminating sections 844 are disposed at appropriate spacing intervals on a ceiling 850A of a building. It is to be noted that the illuminating section 844 may be installed not only on the ceiling 850A, but also on any location such as a wall 850B or a floor (not illustrated in the diagram) depending on the intended use.

In these lighting apparatuses, illumination is performed through the light from the light-emitting device 10. Here, the lighting apparatuses include the light-emitting device 10 that improves the uniformity of the in-plane luminance distribution, thus leading to improvement in illumination quality.

The disclosure has been described heretofore with reference to the embodiments, and the modification examples; however, the disclosure is not limited to the foregoing embodiments, modification examples, and experimental example, and may be modified in a variety of ways. For example, although an example in which the plurality of cells CR are disposed in matrix is illustrated in FIG. 2, the disclosure is not limited thereto. For example, as in a light-emitting device 10E illustrated in FIG. 16, a diagonal direction (a direction other than a direction orthogonal to the X-direction) may be adopted as the other arranged direction, relative to one arranged direction. In addition, the shape of each cell region CR is not limited to a square, and may be substantially circular and substantially hexagonal.

In addition, dimensions, dimensional ratios, and shapes of the respective constitutional elements illustrated in each drawing are merely illustrative, and the disclosure is not limited thereto.

Further, for example, in the foregoing embodiments, the description has been given on the case where the light source 1 is an LED; however, the light source 1 may be configured by a semiconductor laser and so forth.

Additionally, for example, in the foregoing embodiments and modification examples, the description has been given by citing, as a specific example, configurations of the light-emitting device 10 and the display apparatus 101 (the television); however, it is unnecessary to provide all of the components, and other components may be provided.

It is to be noted that the effects described herein are merely illustrative and non-limiting, and may further include other effects. Further, the technology may have the following configurations.

(1) A light-emitting device including:
a base having a surface;
one or more light sources provided on the surface of the base, the light sources each having an optical axis;
a reflective lens provided to interpose the light source between the reflective lens and the base;
a reflective member provided to surround the light source along the surface of the base, the reflective member including a first surface that makes a first angle relative to a plane that is substantially orthogonal to the optical axis to allow the first surface to be away also from the base as the first surface is away from the light source; and
a light diffusion member provided to interpose the light source, the reflective lens, and the reflective member, between the light diffusion member and the base.

(2) The light-emitting device according to (1), in which the reflective member includes a first region part that surrounds the light source, and a second region part provided between the light source and the first region part, the second region part surrounding the light source,
the first region part includes the first surface, and
the second region part includes a second surface that makes a second angle, that is smaller than the first angle, relative to the plane that is substantially orthogonal to the optical axis to allow the second surface to be away also from the base as the second surface is away from the light source.

(3) The light-emitting device according to (2), in which the reflective member further includes, between the light source and the second region part, a third region part that is directly or indirectly fixed to the base.

(4) The light-emitting device according to (2) or (3), in which the reflective member further includes, between the first region part and the second region part, a fourth region part that includes a fourth surface formed by a curved surface, the curved surface joining the first surface and the second surface together.

(5) The light-emitting device according to any one of (1) to (4), in which the first region part includes an outermost edge located at a position that is most distant from the base in the reflective member.

(6) The light-emitting device according to (5), in which the reflective lens includes an upper end edge located at a position of a first height from the surface of the base, and
the outermost edge of the first region part is located at a position of a second height from the surface of the base, the second height being lower than the first height.

(7) A display apparatus provided with a liquid crystal panel, and a light-emitting device provided on rear surface side of the liquid crystal panel, the light-emitting device including:
a base having a surface;
one or more light sources provided on the surface of the base, the light sources each having an optical axis;
a reflective lens provided to interpose the light source between the reflective lens and the base;
a reflective member provided to surround the light source along the surface of the base, the reflective member including a first surface that makes a first angle relative to a plane that is substantially orthogonal to the optical axis to allow the first surface to be away also from the base as the first surface is away from the light source; and
a light diffusion member provided to interpose the light source, the reflective lens, and the reflective member, between the light diffusion member and the base.

(8) A lighting apparatus provided with a light-emitting device, the light-emitting device including:
a base having a surface;
one or more light sources provided on the surface of the base, the light sources each having an optical axis;
a reflective lens provided to interpose the light source between the reflective lens and the base;
a reflective member provided to surround the light source along the surface of the base, the reflective member including a first surface that makes a first angle relative to a plane that is substantially orthogonal to the optical axis to allow the first surface to be away also from the base as the first surface is away from the light source; and
a light diffusion member provided to interpose the light source, the reflective lens, and the reflective member, between the light diffusion member and the base.

The present application is based upon and claims priority from Japanese Patent Application No. 2015-128409 filed with the Japan Patent Office on Jun. 26, 2015, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A light-emitting device, comprising:
a base that has a surface;
a plurality of light sources on respective ones of a plurality of light source substrates fixed to the surface of the base, wherein each of the plurality of light sources has an optical axis;
a reflective lens provided to interpose a light source, of the plurality of light sources, between the reflective lens and the base;
a reflective member which includes a first region part and a second region part, wherein:
the reflective member surrounds the light source along the surface of the base,
the first region part includes a first surface that defines a first angle relative to a plane such that the first surface is away from the base and the light source,
the plane is orthogonal to the optical axis,
the reflective member further includes a third region part between the first region part and the second region part, and
the third region part includes a curved surface which joins the first surface and a second surface of the second region part;
a first light diffusion member to interpose the light source, the reflective lens, and the reflective member, between the first light diffusion member and the base; and
drive circuitry formed within each of the plurality of light source substrates and arranged relative to the reflective lens and the reflective member such that a first portion of the drive circuitry is interposed between the reflective lens and the base and a second portion of the drive circuitry is interposed between the reflective member and the base.

2. The light-emitting device according to claim 1, wherein
the second region part is between the light source and the first region part, and
the second region part includes the second surface that makes a second angle, that is smaller than the first angle, relative to the plane such that the second surface is away from the base and the light source.

3. The light-emitting device according to claim 2, wherein the reflective member further includes, between the light source and the second region part, a fourth region part that is one of directly or indirectly fixed to the base.

4. The light-emitting device according to claim 2, wherein the third region part includes a third surface as the curved surface.

5. The light-emitting device according to claim 1, wherein the first region part includes an outermost edge located at a position that is at a particular distance from the base.

6. The light-emitting device according to claim 5, wherein:
the reflective lens includes an upper end edge located at a position of a first height from the surface of the base, and
the outermost edge of the first region part is located at a position of a second height from the surface of the base, the second height being lower than the first height.

7. A display apparatus, comprising:
a liquid crystal panel, and
a light-emitting device on a rear surface side of the liquid crystal panel, wherein the light-emitting device comprises:
a base that has a surface;
a plurality of light sources each fixed to a respective light substrate, each respective light source substrate formed on the surface of the base, wherein each of the plurality of light sources has an optical axis;
a reflective lens provided to interpose a light source, of the plurality of light sources, between the reflective lens and the base;
a reflective member which includes a first region part and a second region part, wherein:
the reflective member surrounds the light source along the surface of the base,
the first region part includes a first surface that defines a first angle relative to a plane such that the first surface is away from the base and the light source,
the plane is orthogonal to the optical axis,
the reflective member further includes a third region part between the first region part and the second region part, and
the third region part includes a curved surface which joins the first surface and a second surface of the second region part; and
a first light diffusion member to interpose the light source, the reflective lens, and the reflective member, between the first light diffusion member and the base; and
drive circuitry formed within each respective light source substrate and arranged relative to the reflective lens and the reflective member such that a first portion of the drive circuitry is interposed between the reflective lens and the base and a second portion of the drive circuitry is interposed between the reflective member and the base.

8. A lighting apparatus, comprising:
a light-emitting device, wherein the light-emitting device comprises:
a base that has a surface;
a plurality of light sources each fixed to a respective light substrate, each respective light source substrate formed on the surface of the base, wherein each of the plurality of light sources has an optical axis;
a reflective lens provided to interpose a light source, of the plurality of light sources, between the reflective lens and the base;
a reflective member which includes a first region part and a second region part, wherein:
the reflective member surrounds the light source along the surface of the base,
the first region part includes a first surface that defines a first angle relative to a plane such that the first surface is away from the base and the light source,
the plane is orthogonal to the optical axis,
the reflective member further includes a third region part between the first region part and the second region part, and
the third region part includes a curved surface which joins the first surface and a second surface of the second region part; and
a first light diffusion member to interpose the light source, the reflective lens, and the reflective member, between the first light diffusion member and the base; and
drive circuitry formed within each respective light source substrate and arranged relative to the reflective lens and the reflective member such that a first portion of the drive circuitry is interposed between the reflective lens and the base and a second portion of the drive circuitry is interposed between the reflective member and the base.

9. The light-emitting device according to claim 1, wherein the second light diffusion member is to interpose the first light diffusion member, the light source, the reflective lens, and the reflective member, between the second light diffusion member and the base.

10. The light-emitting device according to claim 9, wherein the first light diffusion member comprises a plurality of lenticular lenses that extends in a X-direction of the light-emitting device and arranged in a Y-direction of the light-emitting device.

11. The light-emitting device according to claim 10, wherein the second light diffusion member comprises the plurality of lenticular lenses that extends in the Y-direction of the light-emitting device and arranged in the X-direction of the light-emitting device.

12. The light-emitting device according to claim 1, further comprising:
a plurality of light source substrates on the surface of the base, wherein the light source is on a light source substrate of the plurality of light source substrates.

13. The light-emitting device according to claim 12, wherein the reflective member further includes, between the light source and the second region part, a fourth region part that is fixed to an upper surface of the light source substrate on the surface of the base.

14. The light-emitting device according to claim 12, wherein the light source substrate includes the drive circuitry which is configured to drive the light source.

15. The light-emitting device according to claim 1, wherein:
the second region part is between the light source and the first region part, and the second region part includes a curved surface.

* * * * *